(12) United States Patent
Ma et al.

(10) Patent No.: US 11,157,198 B2
(45) Date of Patent: Oct. 26, 2021

(54) GENERATING MERGE-FRIENDLY SEQUENTIAL IO PATTERNS IN SHARED LOGGER PAGE DESCRIPTOR TIERS

(71) Applicant: EMC IP Holding Company LLC, Hopkinton, MA (US)

(72) Inventors: Chun Ma, Beijing (CN); Socheavy Heng, Framingham, MA (US); Geng Han, Beijing (CN); Hongpo Gao, Beijing (CN); Shaoqin Gong, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/817,207

(22) Filed: Mar. 12, 2020

(65) Prior Publication Data
US 2021/0286548 A1    Sep. 16, 2021

(51) Int. Cl.
*G06F 3/06* (2006.01)
(52) U.S. Cl.
CPC ............ *G06F 3/0655* (2013.01); *G06F 3/061* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 8,898,388 B1* | 11/2014 | Kimmel | G06F 12/0893 |
| | | | 711/114 |
| 9,335,948 B1 | 5/2016 | Kirac et al. | |
| 9,959,074 B1 | 5/2018 | Shain et al. | |
| 10,360,192 B1 | 7/2019 | Sela et al. | |
| 10,482,029 B1 | 11/2019 | Chanler et al. | |
| 10,558,613 B1 | 2/2020 | Shveidel et al. | |
| 2012/0042125 A1* | 2/2012 | Kumar | G06F 12/0866 |
| | | | 711/118 |

\* cited by examiner

*Primary Examiner* — Jane Wei
(74) *Attorney, Agent, or Firm* — BainwoodHuang

(57) ABSTRACT

Techniques for generating merge-friendly sequential IO patterns in shared logger page descriptor (PD) tiers. The techniques can be employed in an active-active clustered system that includes a primary storage node, a secondary storage node, a logger shared between the primary and secondary storage nodes, and a storage device such as a non-volatile memory (NVM) device. The techniques can include allocating at least a first trunk and a second trunk in a shared PD tier of the logger, sequentially writing PD metadata and/or data by the primary storage node and the secondary storage node to the first trunk and the second trunk, respectively, merging the PD metadata/data units sequentially written to each respective trunk together to obtain PD metadata/data having an increased size up to the size of the respective trunks, and storing the merged PD metadata/data to the NVM device.

20 Claims, 10 Drawing Sheets

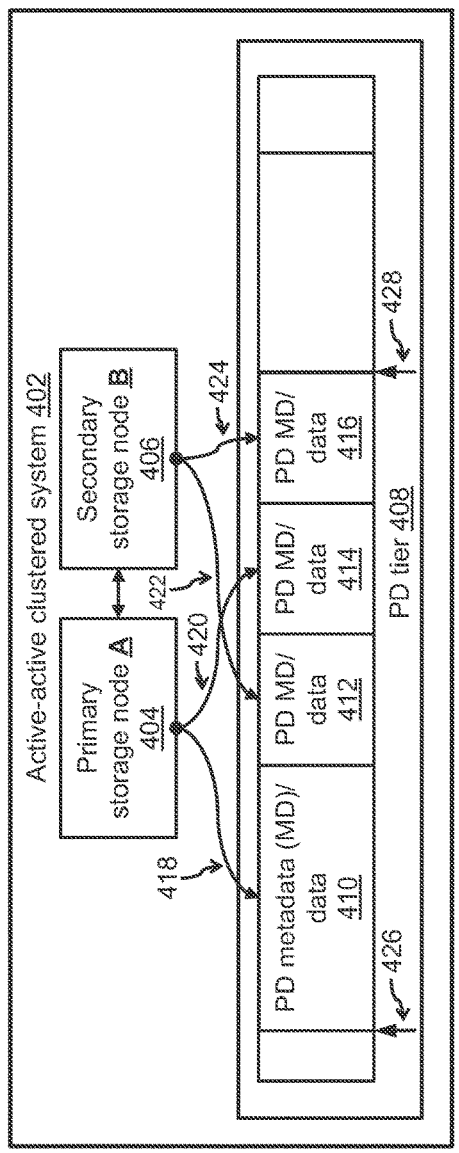
Fig. 4 – Prior art
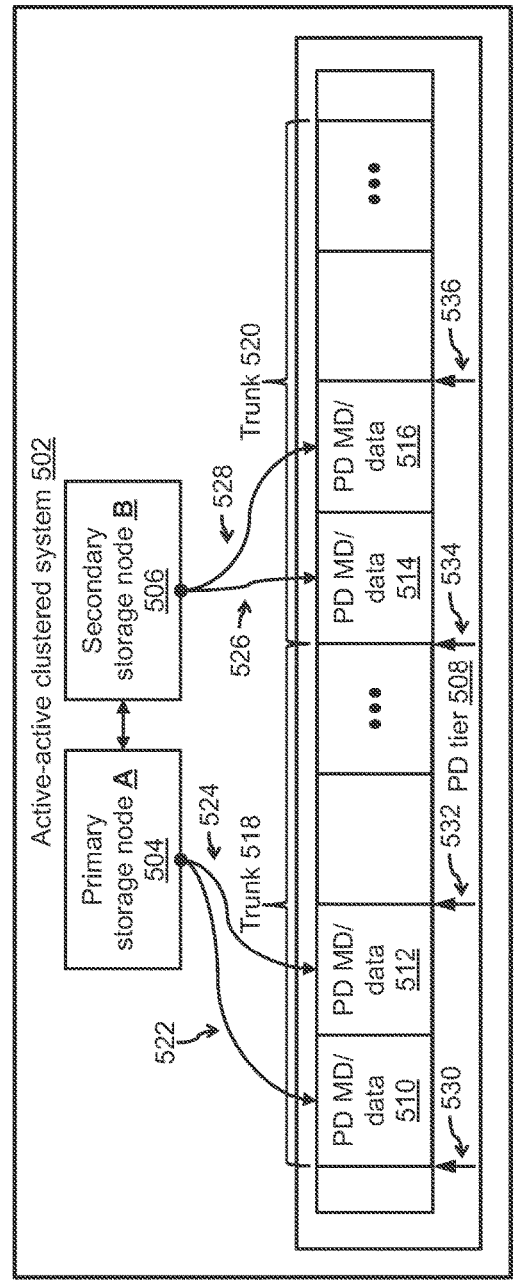
Fig. 5

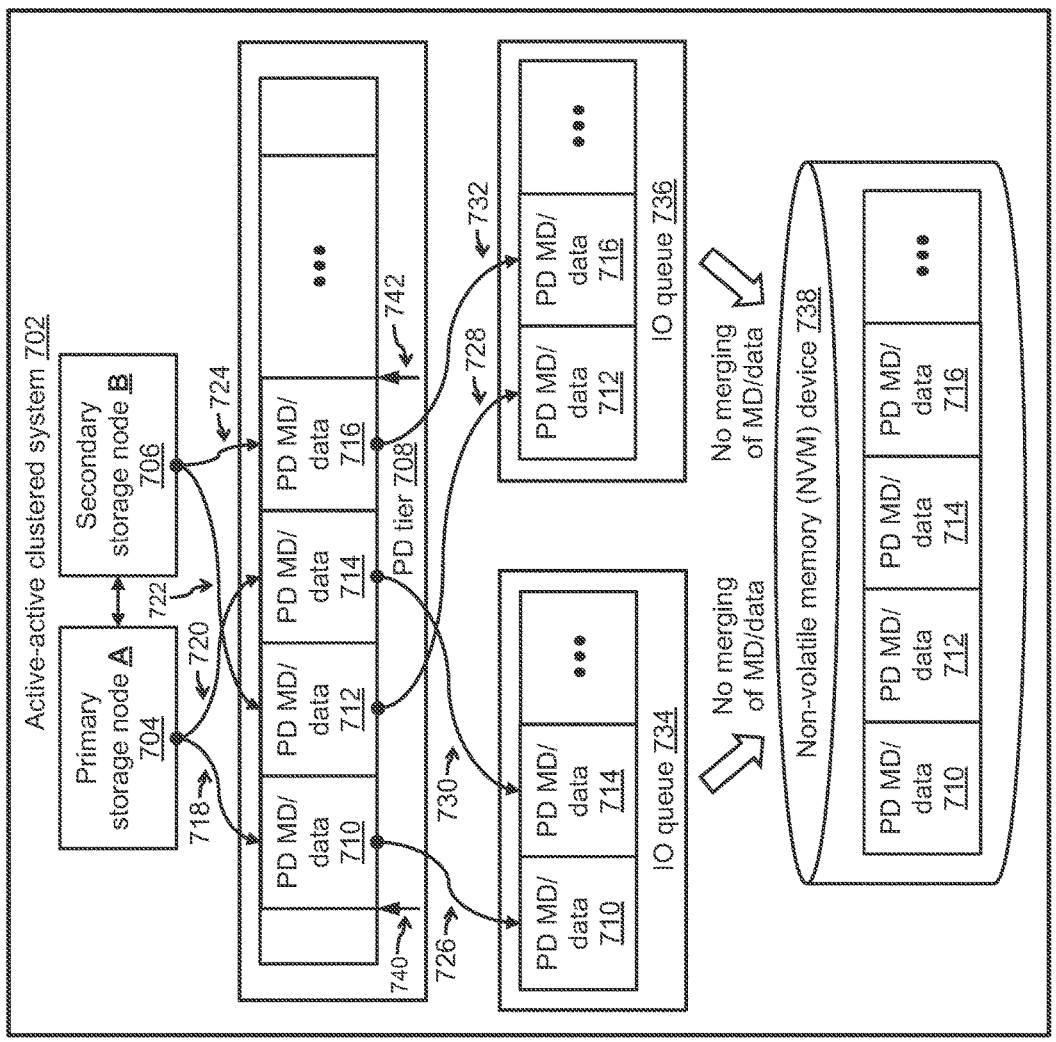
Fig. 7 – Prior art

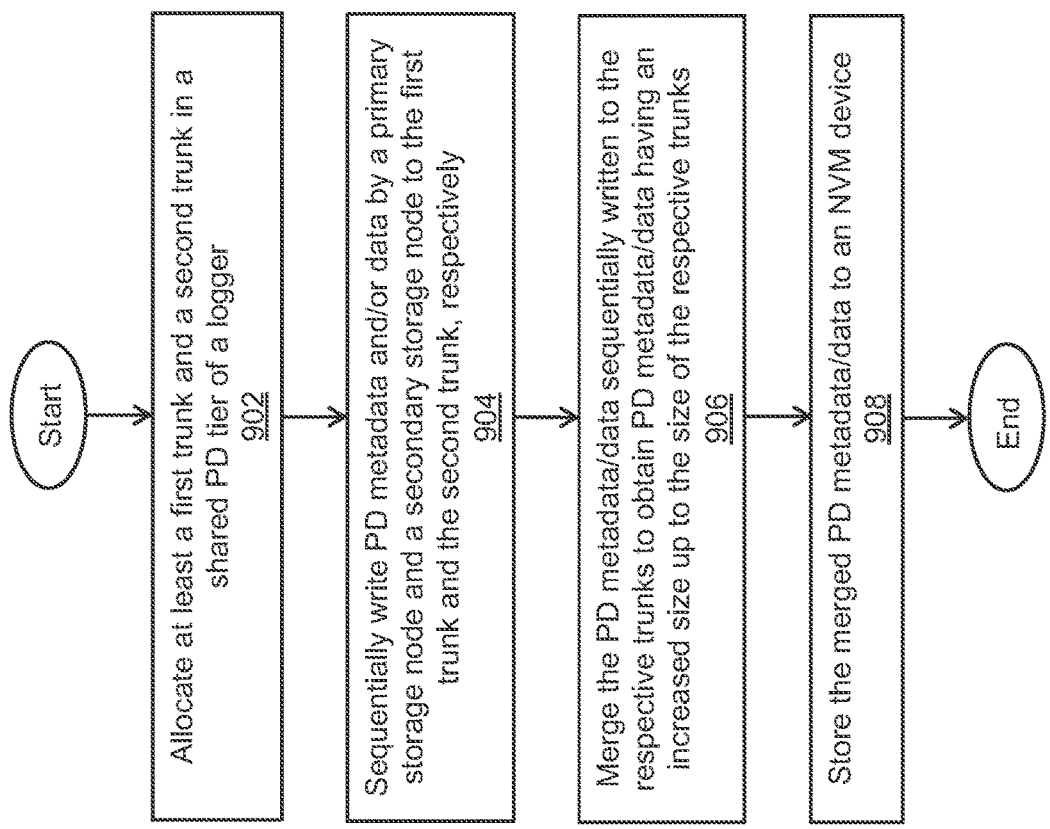

GENERATING MERGE-FRIENDLY SEQUENTIAL IO PATTERNS IN SHARED LOGGER PAGE DESCRIPTOR TIERS

BACKGROUND

Active-active clustered systems enable multiple data storage processors (also referred to herein as "storage nodes") to have read-write input/output (IO) access to the same storage objects (e.g., volumes, logical units (LUs), file systems) or other shared resources. In response to receipt of a write IO request for a storage object from a host computer, a storage node writes pending changes to metadata and/or data of the storage object to a journal (also referred to herein as a "logger"). Having written the pending metadata/data changes to the logger, the storage node sends an acknowledgement message to the host computer that issued the write IO request. The pending changes to the metadata/data of the storage object are then stored from the logger to one or more storage devices.

SUMMARY

Active-active clustered systems can be configured to include multiple storage nodes including a primary storage node and a secondary storage node, as well as multiple storage tiers such as a low capacity storage tier (e.g., a logger) implemented in persistent memory, a medium capacity storage tier implemented using solid-state drives (SSDs), and a high capacity storage tier implemented using hard disk drives (HDDs). Such active-active clustered systems can be further configured to include non-volatile memory (NVM) devices, which can be implemented as block devices for storing metadata and/or data from the logger. For example, an NVM device can be configured with a dual in-line memory module (DIMM) interface or an NVM express (NVMe) interface. Such NVM devices can provide advantages over volatile memory devices (e.g., dynamic random-access memory (DRAM) devices), in that they will not lose data when power is lost. Such NVM devices can also provide advantages over SSDs, such as higher IO performance, reduced latency, and byte addressing capabilities.

In such active-active clustered systems, a logger can be shared between a primary storage node and a secondary storage node. The logger can also be configured to include multiple tiers, such as a page descriptor (PD) tier(s) for logging PD metadata and/or data and a page buffer (PB) tier(s) for logging PB metadata and/or data. The primary storage node and the secondary storage node can write PD metadata/data to the same PD tier(s) of the logger. For example, the primary and secondary storage nodes can perform write IO operations, each specifying PD metadata/data having a size of 512 bytes or any other suitable size, directed to the same PD tier of the logger. The primary storage node and the secondary storage node can also write PB metadata/data to their own respective PB tier(s) of the logger. For example, the primary and secondary storage nodes can perform write IO operations, each specifying PB metadata/data having a size of 4 kilobytes (KB) or any other suitable size, directed to their own respective PB tiers of the logger. The PD and PB metadata/data written to the respective PD and PB tiers of the logger can then be stored to one or more storage devices, such as one or more NVM devices.

However, storing PD metadata and/or data written by primary and secondary storage nodes from the same PD tier of a logger to one or more NVM devices can be problematic. For example, while an NVM device can provide high IO performance when storing PB metadata and/or data having a size of 4 KB, its IO performance can suffer when storing PD metadata and/or data having a smaller size of 512 bytes. One possible solution to this problem may be to perform IO merging to merge multiple 512-byte PD metadata/data units together to increase the size of the PD metadata/data to be stored to the NVM device. As described herein, however, the primary and secondary storage nodes can write PD metadata/data to the same PD tier(s) of the logger. As a result, at least some of the 512-byte PD metadata/data units written by the respective storage nodes to the same PD tier(s) may have logical block addresses (LBAs) that are discontinuous. In other words, the IO corresponding to the 512-byte PD metadata/data written by the respective storage nodes may be nonsequential, making it difficult to efficiently merge the PD metadata/data for subsequent storage to the NVM device.

Techniques are disclosed herein for generating merge-friendly sequential IO patterns in shared logger page descriptor (PD) tiers. The disclosed techniques can be employed in an active-active clustered system that includes a primary storage node, a secondary storage node, a logger shared between the primary and secondary storage nodes, and at least one storage device such as a non-volatile memory (NVM) device. In the disclosed techniques, the primary storage node can perform a write IO operation specifying PD metadata and/or data to be written to a PD tier of the logger. In response to the write IO operation of the primary storage node, a first data segment (also referred to herein as the first "trunk") can be allocated in the PD tier of the logger. The first trunk can have an associated head pointer and an associated tail pointer, as well as a size equal to a predetermined multiple of the size of the PD metadata/data specified by the write IO operation. Having allocated the first trunk in the PD tier, the write IO operation of the primary storage node can be performed by writing a PD metadata/data unit to the head of the first trunk.

In the disclosed techniques, before performing a commit of an IO transaction, the secondary storage node can obtain authorization from the primary storage node to write PD metadata/data to the same PD tier of the logger. Once such authorization to write PD metadata/data has been obtained from the primary storage node, the secondary storage node can perform a write IO operation specifying the PD metadata/data to be written to the PD tier of the logger. In response to the write IO operation of the secondary storage node, a second data segment (also referred to herein as the second "trunk") can be allocated in the PD tier of the logger. Like the first trunk, the second trunk can have an associated head pointer and an associated tail pointer, as well as a size equal to a predetermined multiple of the size of the PD metadata/data specified by the write IO operation. Having allocated the second trunk in the PD tier, the write IO operation of the secondary storage node can be performed by writing a PD data/metadata unit to the head of the second trunk.

Subsequent write IO operations of the primary storage node and the secondary storage node can be performed by sequentially writing specified PD metadata and/or data to the first trunk and the second trunk, respectively, of the logger. Once the first trunk and/or the second trunk have reached their storage capacities, one or more additional trunks can be allocated in the same PD tier of the logger for storing PD metadata/data sequentially written by the respective storage nodes. Because the PD metadata/data units written to the first and second trunks by the respective storage nodes are LBA continuous (i.e., the corresponding IO is sequential), they can be efficiently merged together to obtain PD metadata/data having an increased size, up to the size of the respective trunks. The PD metadata/data having the increased size can then be stored to an NVM device. By allocating at least a first trunk and a second trunk in a shared PD tier of a logger, sequentially writing PD metadata and/or data by a primary storage node and a secondary storage node to the first trunk and the second trunk, respectively, merging the PD metadata/data sequentially written to the respective trunks to obtain PD metadata/data having an increased size up to the size of the respective trunks, and storing the merged PD metadata/data to an NVM device, an IO performance level of the NVM device can be improved.

In certain embodiments, a method of generating merge-friendly sequential input/output (IO) patterns in a shared page descriptor (PD) tier includes allocating at least a first trunk and a second trunk in a shared PD tier of a logger, sequentially writing PD metadata and/or data by a primary storage node and a secondary storage node to the first trunk and the second trunk, respectively, merging the PD metadata and/or data sequentially written to each of the first trunk and the second trunk to obtain merged PD metadata and/or data, and storing the merged PD metadata and/or data to an NVM device.

In certain arrangements, the first trunk has an associated head pointer and an associated tail pointer, and the method further includes writing the PD metadata and/or data to a head of the first trunk.

In certain arrangements, the second trunk has an associated head pointer and an associated tail pointer, and the method further includes writing the PD metadata and/or data to a head of the second trunk.

In certain arrangements, the method further includes, in response to the first trunk having reached its storage capacity, allocating a third trunk in the shared PD tier of the logger, and sequentially writing, by the primary storage node, PD metadata and/or data to the third trunk.

In certain arrangements, the method further includes, in response to the second trunk having reached its storage capacity, allocating a fourth trunk in the shared PD tier of the logger, and sequentially writing, by the secondary storage node, PD metadata and/or data to the fourth trunk.

In certain arrangements, the method further includes pushing the PD metadata and/or data sequentially written to the first trunk to a first IO queue, and merging the PD metadata and/or data in the first IO queue to obtain first merged PD metadata and/or data.

In certain arrangements, the method further includes pushing the PD metadata and/or data sequentially written to the second trunk to a second IO queue, and merging the PD metadata and/or data in the second IO queue to obtain second merged PD metadata and/or data.

In certain arrangements, the method further includes storing the first merged PD metadata and/or data and the second merged PD metadata and/or data from the first IO queue and the second IO queue, respectively, to the NVM device.

In certain arrangements, the method further includes obtaining, by the secondary storage node, authorization from the primary storage node to write PD metadata and/or data to the shared PD tier of the logger.

In certain arrangements, the method further includes allocating the second trunk in the shared PD tier in response to the authorization from the primary storage node being obtained.

In certain embodiments, an active-active clustered system includes a primary storage node, a secondary storage node, a first IO queue, a second IO queue, a logger including a shared page descriptor (PD) tier, and a non-volatile memory (NVM) device. The primary storage node is configured to allocate at least a first trunk and a second trunk in the shared PD tier of the logger, and to sequentially write PD metadata and/or data to the first trunk. The secondary storage node is configured to sequentially write PD metadata and/or data to the second trunk. The logger is configured to be controlled for pushing the PD metadata and/or data from the first trunk to the first IO queue, and for pushing the PD metadata and/or data from the second trunk to the second IO queue. The first IO queue is configured to be controlled for merging the PD metadata and/or data pushed from the first trunk to obtain first merged PD metadata and/or data, and for storing the first merged PD metadata and/or data to the NVM device. The second IO queue is configured to be controlled for merging the PD metadata and/or data pushed from the second trunk to obtain second merged PD metadata and/or data, and for storing the second merged PD metadata and/or data to the NVM device.

In certain arrangements, the first trunk has an associated head pointer and an associated tail pointer, and the primary storage node is further configured to write PD metadata and/or data to a head of the first trunk.

In certain arrangements, the second trunk has an associated head pointer and an associated tail pointer, and the secondary storage node is further configured to write PD metadata and/or data to a head of the second trunk.

In certain arrangements, the primary storage node is further configured, in response to the first trunk having reached its storage capacity, to allocate a third trunk in the shared PD tier of the logger, and to sequentially write PD metadata and/or data to the third trunk.

In certain arrangements, the primary storage node is further configured, in response to the second trunk having reached its storage capacity, to allocate a fourth trunk in the shared PD tier of the logger.

In certain arrangements, the secondary storage node is further configured to sequentially write PD metadata and/or data to the fourth trunk.

In certain embodiments, a computer program product includes a set of non-transitory, computer-readable media having instructions that, when executed by storage processing circuitry, cause the storage processing circuitry to perform a method that includes allocating at least a first trunk and a second trunk in a shared page descriptor (PD) tier of a logger, sequentially writing PD metadata and/or data by a primary storage node and a secondary storage node to the first trunk and the second trunk, respectively, merging the PD metadata and/or data sequentially written to each of the first trunk and the second trunk to obtain merged PD metadata and/or data, and storing the merged PD metadata and/or data to an NVM device.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 4 is a block diagram of a conventional active-active clustered system, including a primary storage node, a secondary storage node, and a PD tier for storing PD metadata/data from the primary and secondary storage nodes;

FIG. 5 is a block diagram of an active-active clustered system, which includes a primary storage node, a secondary storage node, and a PD tier for storing PD metadata/data from the primary and secondary storage nodes;

FIG. 7 is a block diagram of a conventional technique for writing PD metadata/data from a PD tier of an active-active clustered system to an NVM device;

FIG. 9 is a flow diagram of an exemplary method of generating merge-friendly sequential IO patterns in a shared PD tier.

DETAILED DESCRIPTION

Techniques are disclosed herein for generating merge-friendly sequential IO patterns in shared logger page descriptor (PD) tiers. The disclosed techniques can be employed in an active-active clustered system that includes a primary storage node, a secondary storage node, a logger shared between the primary and secondary storage nodes, and at least one storage device such as a non-volatile memory (NVM) device. The disclosed techniques can include allocating at least a first trunk and a second trunk in a shared PD tier of the logger, sequentially writing PD metadata and/or data by the primary storage node and the secondary storage node to the first trunk and the second trunk, respectively, merging the PD metadata/data sequentially written to the respective trunks to obtain PD metadata/data having an increased size up to the size of the respective trunks, and storing the merged PD metadata/data to the NVM device. In this way, an IO performance level of the NVM device can be improved.

Figure 1A:
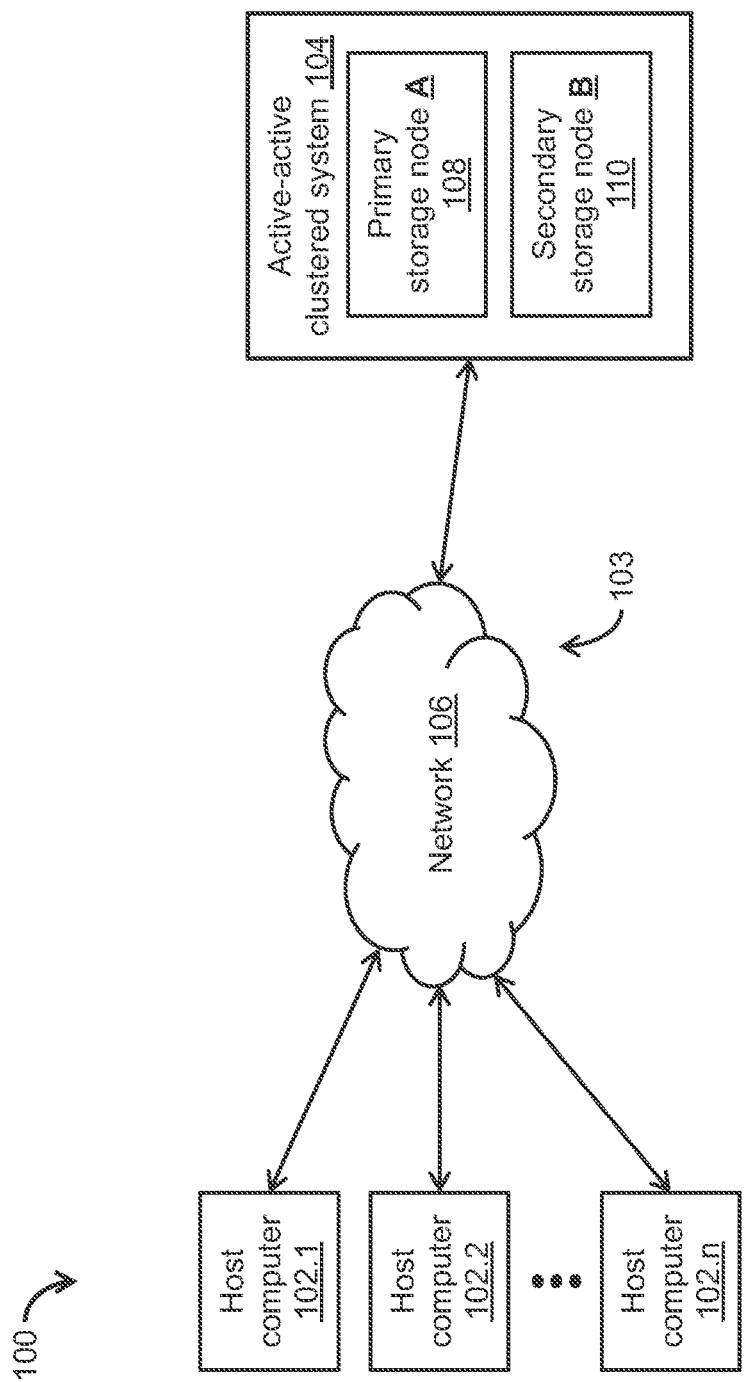
FIG. 1a is a block diagram of an exemplary data storage environment, in which techniques can be practiced for generating merge-friendly sequential input/output (IO) patterns in shared logger page descriptor (PD) tiers.

FIG. 1a depicts an illustrative embodiment of an exemplary data storage environment 100, in which techniques can be practiced for generating merge-friendly sequential input/output (IO) patterns in shared logger page descriptor (PD) tiers. As shown in FIG. 1a, the data storage environment 100 can include a plurality of host computers 102.1, 102.2, . . . , 102.n, an active-active data storage system (also referred to herein as the "active-active clustered system") 104, and a communications medium 103 that includes at least one network 106. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 106, storage input/output (IO) requests (e.g., small computer system interface (SCSI) commands, network file system (NFS) commands) to the active-active clustered system 104. Such storage IO requests (e.g., write IO requests, read IO requests) can direct a data storage processor(s) (also referred to herein as a "storage node(s)") to write or read data blocks, data pages, data files, or any other suitable data elements to/from volumes (VOLs), logical units (LUs), file systems, and/or any other suitable storage objects maintained in association with the active-active clustered system 104.

The communications medium 103 can be configured to interconnect the plurality of host computers 102.1, . . . , 102.n and the storage nodes (e.g., a primary storage node A 108, a secondary storage node B 110) of the active-active clustered system 104 to enable them to communicate and exchange data and/or control signaling. As shown in FIG. 1a, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic-based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

Figure 1B:
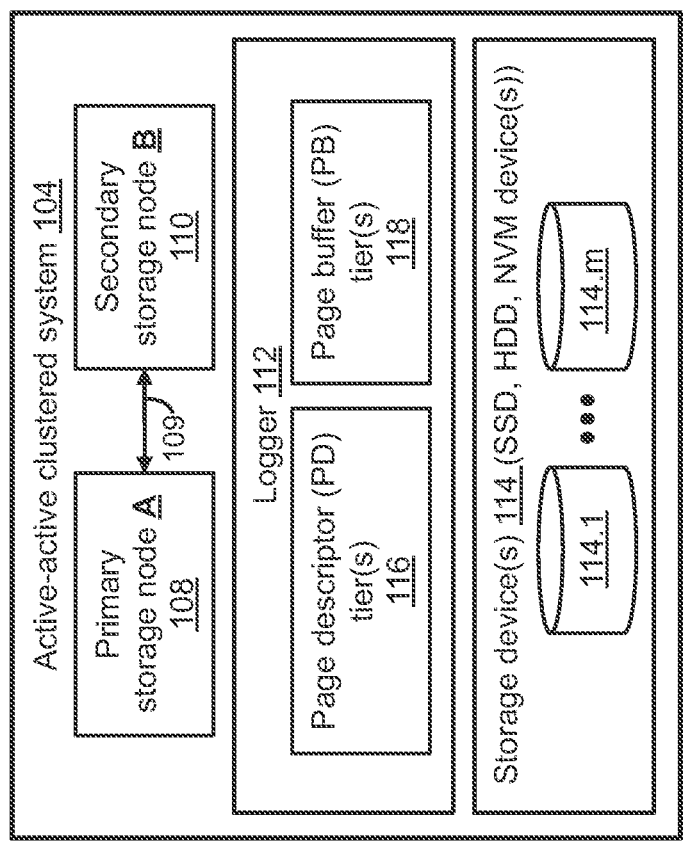
FIG. 1b is a block diagram of an active-active clustered system in the data storage environment of FIG. 1a, in which the active-active clustered system includes a primary storage node, a secondary storage node, a journal (or logger) having PD tiers and page buffer (PB) tiers, and storage devices including a non-volatile memory (NVM) device.

FIG. 1b depicts a detailed view of the active-active clustered system 104 of FIG. 1a. As employed herein, the term "active-active clustered system" refers to a highly available data storage system, in which multiple data storage nodes (e.g., the primary storage node A 108, the secondary storage node B 110) have read-write IO access to the same storage objects (e.g., volumes (VOLs), logical units (LUs), file systems) or other shared resources. As shown in FIG. 1b, the active-active clustered system 104 can include at least two storage nodes for high availability, namely, the primary storage node A 108 and the secondary storage node B 110, which can be communicably connected to one another by a communication path(s) 109. For example, the primary storage node A 108 can receive storage IO requests from the respective host computers 102.1, . . . , 102.n over the network 106. In response to the storage IO requests, the primary storage node A 108 can perform storage IO operations (e.g., write IO operations, read IO operations) to write/read data blocks, data pages, data files, or any other suitable data elements to/from one or more storage objects or other resources maintained in association with the active-active clustered system 104. Further, at least at intervals, the primary storage node A 108 can update or synchronize page descriptor (PD) metadata and/or data and page buffer (PB) metadata and/or data maintained in a journal (or logger) 112 by the primary storage node A 108 with corresponding PD and PB metadata and/or data written to the logger 112 by the secondary storage node B 110. As a result, in the event of a failure of the primary storage node A 108 or at any other suitable time, the secondary storage node B 110 can assume the role and/or duties of the primary storage node A 108 with regard to the handling of storage IO requests, providing high availability within the active-active clustered system 104.

As further shown in FIG. 1b, the active-active clustered system 104 can include the logger 112 and one or more storage devices 114. The logger 112 can be implemented in persistent memory such as non-volatile random-access memory (NVRAM). In certain implementations, the NVM express (NVMe) interface specification (or any other suitable interface specification) can be employed for accessing non-volatile storage media of the logger 112. The logger 112 can be configured to include multiple ports to allow the primary storage node A 108 and the secondary storage node B 110 to have direct access to the logger 112. The logger 112 can also be configured to include one or more PD tiers 116 for logging or storing PD metadata and/or data, as well as one or more PB tiers 118 for logging or storing PB metadata and/or data. In certain implementations, each PD/PB tier 116, 118 of the logger 112 can be configured as a ring buffer, a linear buffer, a binary tree (e.g., a B-tree), or any other suitable memory structure. The storage device(s) 114.1, ..., 114.m can include a solid-state drive (SSD) device(s), a hard disk drive (HDD) device(s), a non-volatile memory (NVM) device(s), and/or any other suitable storage device(s) for storing storage object metadata and/or data.

Figure 2:
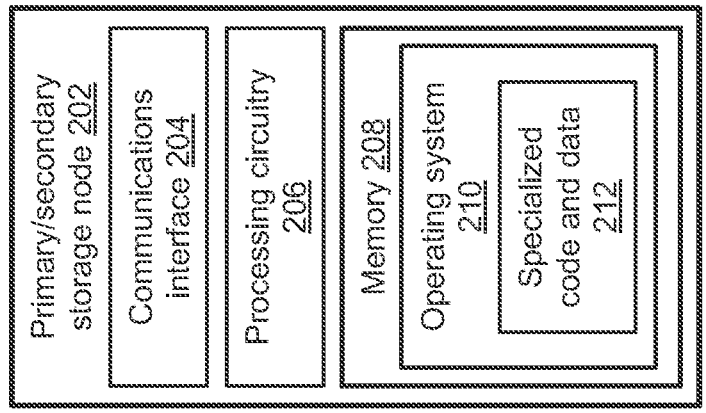
FIG. 2 is a block diagram of an exemplary primary or secondary storage processor (or node) included in the active-active clustered system of FIG. 1b.

FIG. 2 depicts an exemplary implementation of a primary or secondary storage node (also referred to herein as a "peer storage node") 202. It is noted that each of the primary storage node A 108 and the secondary storage node B 110 of the active-active clustered system 104 can be implemented like the peer storage node 202 of FIG. 2. As shown in FIG. 2, the peer storage node 202 can include a communications interface 204, processing circuitry 206, a memory 208, and/or any other suitable storage node component(s). The communications interface 204 can include one or more of an InfiniBand interface, an Ethernet interface, an IEEE 802.11x (WiFi) interface, a Bluetooth interface, and/or any other suitable communications interface. The communications interface 204 can further include SCSI target adapters, network interface adapters, and/or any other suitable adapters for converting electronic, optical, and/or wireless signals received over the network 106 to a form suitable for use by the processing circuitry 206.

The memory 208 can include persistent memory (e.g., flash memory, magnetic memory) and/or non-persistent memory (e.g., dynamic random-access memory (DRAM), static random-access memory (SRAM)). The memory 208 can be configured to store a variety of software constructs realized in the form of specialized code and data 212 (e.g., program instructions) that can be executed by the processing circuitry 206 to carry out the techniques and/or methods disclosed herein. As shown in FIG. 2, the memory 208 can further include an operating system 210 (e.g., Linux operating system (OS), Unix OS, Windows OS). The processing circuitry 206 can include one or more physical storage processors and/or engines configured to execute the specialized code and data 212, as well as data movers, director boards, blades, IO modules, storage drive controllers, switches, and/or any other suitable computer hardware or combination thereof. For example, the processing circuitry 206 can execute the specialized code and data 212 as program instructions out of the memory 208, process storage IO requests (e.g., write IO requests, read IO requests) issued by the respective host computers 102.1, ..., 102.n, and/or store metadata and/or data to the logger 112 and/or the storage device(s) 114.1, ..., 114.m within the data storage environment 100, such as a clustered RAID environment.

In the context of the processing circuitry 206 of the peer storage node 202 being implemented using one or more processors executing the specialized code and data 212, a computer program product can be configured to deliver all or a portion of the specialized code and data 212 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 3:
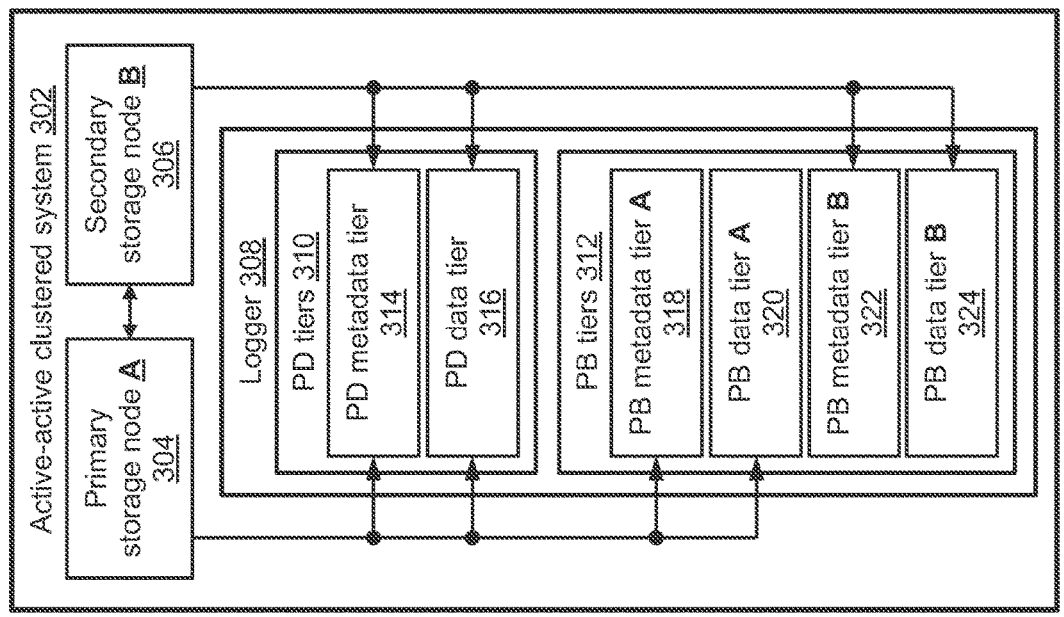
FIG. 3 is a block diagram of an active-active clustered system, which includes a primary storage node, a secondary storage node, and a logger having PD tiers and PB tiers for storing PD metadata and/or data and PB metadata and/or data, respectively, from the primary and secondary storage nodes.

FIG. 3 depicts a detailed view of an active-active clustered system 302 like the active-active clustered system 104 of FIGS. 1a and 1b. As shown in FIG. 3, the active-active clustered system 302 can include a primary storage node A 304, a secondary storage node B 306, and a logger 308. The logger 308 can include a plurality of PD tiers 310, namely, a PD metadata tier 314 and a PD data tier 316, as well as a plurality of PB tiers 312, namely, a PB metadata tier A 318, a PB data tier A 320, a PB metadata tier B 322, and a PB data tier B 324. Each of the primary storage node A 304 and the secondary storage node B 306 can write PD metadata and PD data to the same PD metadata tier 314 and PD data tier 316, respectively. For example, the primary and secondary storage nodes A 304, B 306 can perform write IO operations, each specifying PD metadata/data having a size of 512 bytes or any other suitable size, directed to the same PD metadata/data tier of the logger 308. In addition, the primary storage node A 304 can write PB metadata and PB data to its own PB metadata tier A 318 and PB data tier A 320, respectively. Likewise, the secondary storage node B 306 can write PB metadata and PB data to its own PB metadata tier B 322 and PB data tier B 324, respectively. For example, the primary and secondary storage nodes A 304, B 306 can perform write IO operations, each specifying PB metadata/data having a size of 4 kilobytes (KB) or any other suitable size, directed to their own respective PB metadata/data tiers of the logger 308.

FIG. 4 depicts a conventional active-active clustered system 402, which includes a primary storage node A 404, a secondary storage node B 406, and a PD tier 408 for storing PD metadata/data written by the primary and secondary storage nodes A 404, B 406. As described herein, primary and secondary storage nodes of an active-active clustered system can perform write IO operations, each specifying PD metadata/data having a size of 512 bytes or any other suitable size, directed to the same PD metadata/data tier of a logger. As further described herein, each PD tier of a logger can be configured as a ring buffer having an associated head pointer and an associated tail pointer.

Accordingly, in the conventional active-active clustered system 402 of FIG. 4, the primary storage node A 404 can perform a write IO operation (illustrated by a path 418) to write PD metadata (MD)/data 410 having a size of 512 bytes to the head of the PD tier 408 configured as a ring buffer. Further, before performing a commit of an IO transaction, the secondary storage node B 406 can obtain authorization from the primary storage node A 404 to write PD MD/data to the PD tier 408. Once such authorization to write PD MD/data has been obtained from the primary storage node A 404, the secondary storage node B 406 can perform a write IO operation (illustrated by a path 422) to write PD MD/data 412 having a size of 512 bytes to the head of the PD tier 408. In addition, the primary storage node A 404 can perform another write IO operation (illustrated by a path 420) to write PD MD/data 414 having a size of 512 bytes to the head of the PD tier 408. Likewise, once further authorization to write PD MD/data has been obtained from the primary storage node A 404, the secondary storage node B 406 can perform another write IO operation (illustrated by a path 424) to write PD MD/data 416 having a size of 512 bytes to the head of the PD tier 408. As shown in FIG. 4, the PD MD/data 410, 412, 414, 416 are written by the respective storage nodes A 404, B 406 between a head pointer 428 and a tail pointer 426 of the PD tier 408 configured as a ring buffer.

It is noted, however, that storing the PD MD/data 410, 412, 414, 416 from the PD tier 408 to an NVM device can be problematic. For example, while an NVM device can provide high IO performance when storing PB metadata and/or data having an increased size of 4 KB, its IO performance can suffer when storing PD metadata and/or data having a smaller size of 512 bytes. One possible solution to this problem may be to perform IO merging to merge multiple 512-byte PD MD/data units together to increase the size of the PD MD/data to be stored to the NVM device. However, because the primary storage node A 404 and the secondary storage node B 406 can, at least at some times, successively alternate between writing PD MD/data to the PD tier 408, the PD MD/data (e.g., the PD MD/data 410, 414) written to the PD tier 408 by the primary storage node A 404 can be logical block address (LBA) discontinuous (i.e., the corresponding IO can be nonsequential). Likewise, the PD MD/data (e.g., the PD MD/data 412, 416) written to the PD tier 408 by the secondary storage node B 406 can be LBA discontinuous (i.e., the corresponding IO can be nonsequential). Unfortunately, such small (e.g., 512 byte) nonsequential IO can be difficult to efficiently merge for subsequent storage to an NVM device. FIG. 5 depicts an active-active clustered system 502, which addresses at least some of the problems associated with the conventional active-active clustered system 402 of FIG. 4. As shown in FIG. 5, the active-active clustered system 502 can include a primary storage node A 504, a secondary storage node B 506, and a PD tier 508 for storing PD MD/data written by the primary and secondary storage nodes A 504, B 506. Like the conventional active-active clustered system 402, the primary and secondary storage nodes A 504, B 506 of the active-active clustered system 502 can perform write IO operations, each specifying PD MD/data having a size of 512 bytes or any other suitable size, directed to the same PD MD/data tier (e.g., the PD tier 508) of a logger. Further, each PD tier (e.g., the PD tier 508) of a logger can be configured as a ring buffer.

Accordingly, in the active-active clustered system 502 of FIG. 5, the primary storage node A 504 can perform a write IO operation to write PD MD/data having a size of 512 bytes to the PD tier 508. To that end, the primary storage node A 504 can allocate a first data segment (also referred to herein as the first "trunk") 518 in the PD tier 508. The first trunk 518 can have an associated head pointer 532 and an associated tail pointer 530, as well as a size equal to a predetermined multiple of the size of the PD MD/data specified by the write IO operation. In certain implementations, the first trunk 518 can have a size equal to a multiple of 250 of the size of the PD MD/data (e.g., 512 bytes) specified by the write IO operation, i.e., 128 KB, or any other suitable size.

Having allocated the first trunk 518 in the PD tier 508, the primary storage node A 504 can perform the write IO operation (illustrated by a path 522) to write PD MD/data 510 having a size of 512 bytes to the head of the first trunk 518. Further, before performing a commit of an IO transaction, the secondary storage node B 506 can obtain authorization from the primary storage node A 504 to write PD MD/data to the PD tier 508. Once such authorization to write PD MD/data has been obtained from the primary storage node A 504, the secondary storage node B 506 can perform a write IO operation to write PD MD/data having a size of 512 bytes to the PD tier 508. To that end, the primary storage node B 504 can allocate a second data segment (also referred to herein as the second "trunk") 520 in the PD tier 508. The second trunk 520 can have an associated head pointer 536 and an associated tail pointer 534, as well as a size equal to a predetermined multiple of the size of the PD MD/data specified by the write IO operation, such as 128 KB or any other suitable size.

Once the second trunk 520 has been allocated in the PD tier 508, the secondary storage node B 506 can perform the write IO operation (illustrated by a path 526) to write PD MD/data 514 having a size of 512 bytes to the head of the second trunk 520. In addition, the primary storage node A 504 can perform another write IO operation (illustrated by a path 524) to sequentially write PD MD/data 512 having a size of 512 bytes to the head of the first trunk 518. Once further authorization to write PD MD/data has been obtained from the primary storage node A 504, the secondary storage node B 506 can perform another write IO operation (illustrated by a path 528) to sequentially write PD MD/data 516 having a size of 512 bytes to the head of the second trunk 520. As shown in FIG. 5, the PD MD/data 510, 512 are written to the first trunk 518 by the primary storage node A 504 between the head pointer 532 and the tail pointer 530 of the first trunk 518. Likewise, the PD MD/data 514, 516 are written to the second trunk 520 by the secondary storage node B 506 between the head pointer 536 and the tail pointer 534 of the second trunk 520.

Subsequent write IO operations of the primary storage node A 504 and the secondary storage node B 506 can be performed by sequentially writing specified PD metadata and/or data to the first trunk 518 and the second trunk 520, respectively, of the PD tier 508. Once the first trunk 518 and/or the second trunk 520 have reached their storage capacities (e.g., 128 KB), one or more additional trunks can be allocated in the PD tier 508 for storing PD MD/data sequentially written by the respective storage nodes A 504, B 506. Because the PD MD/data units written to the first and second trunks 518, 520 by the respective storage nodes A 504, B 506 are LBA continuous (i.e., the corresponding IO is sequential), they can be efficiently merged together to obtain PD MD/data having an increased size, up to the size of the respective trunks 518, 520. The merged PD MD/data units including the PD MD/data 510, 512 from the first trunk 518 can then be stored to an NVM device. Likewise, the merged PD MD/data units including the PD MD/data 514, 516 from the second trunk 520 can then be stored to the NVM device. By allocating at least the first trunk 518 and the second trunk 520 in the shared PD tier 508, sequentially writing PD metadata and/or data by the primary storage node A 504 and the secondary storage node B 506 to the first trunk 518 and the second trunk 520, respectively, merging the PD MD/data sequentially written to the respective trunks 518, 520 to obtain PD MD/data having an increased size up to the size of the respective trunks 518, 520, and storing the merged PD MD/data to an NVM device, an IO performance level of the NVM device can be improved.

The disclosed techniques for generating merge-friendly sequential input/output (IO) patterns in shared logger page descriptor (PD) tiers will be further understood with reference to the following illustrative examples, and FIGS. 6a-6e, 7, and 8. In a first example, an active-active clustered system 602 (see FIG. 6a) includes a primary storage node A 604, a secondary storage node B 606, and a PD tier 608 for storing PD MD/data written by the primary and secondary storage nodes A 604, B 606. The PD tier 608 is configured as a ring buffer, which is empty in an initial state.

Figure 6A:
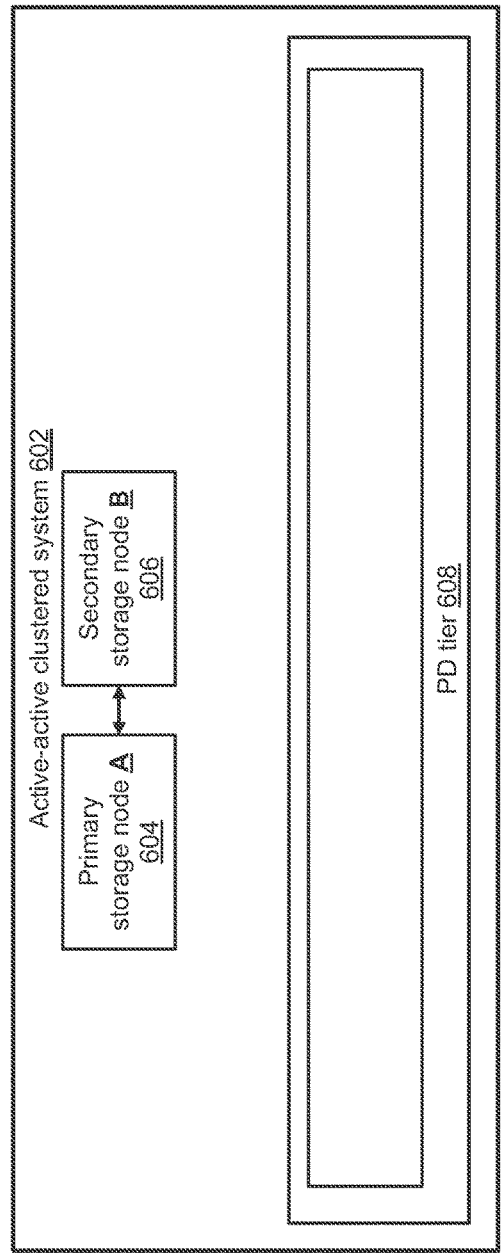
FIGS. 6a-6e are block diagrams of an active-active clustered system, illustrating steps for generating merge-friendly sequential IO patterns in a shared PD tier.
Figure 6B:
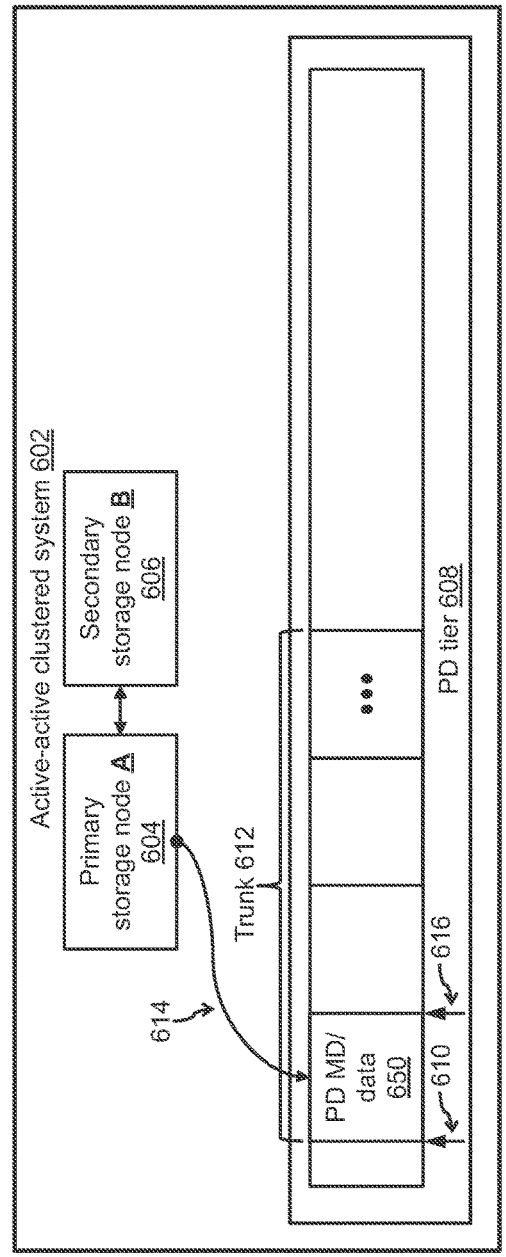
Figure 6C:
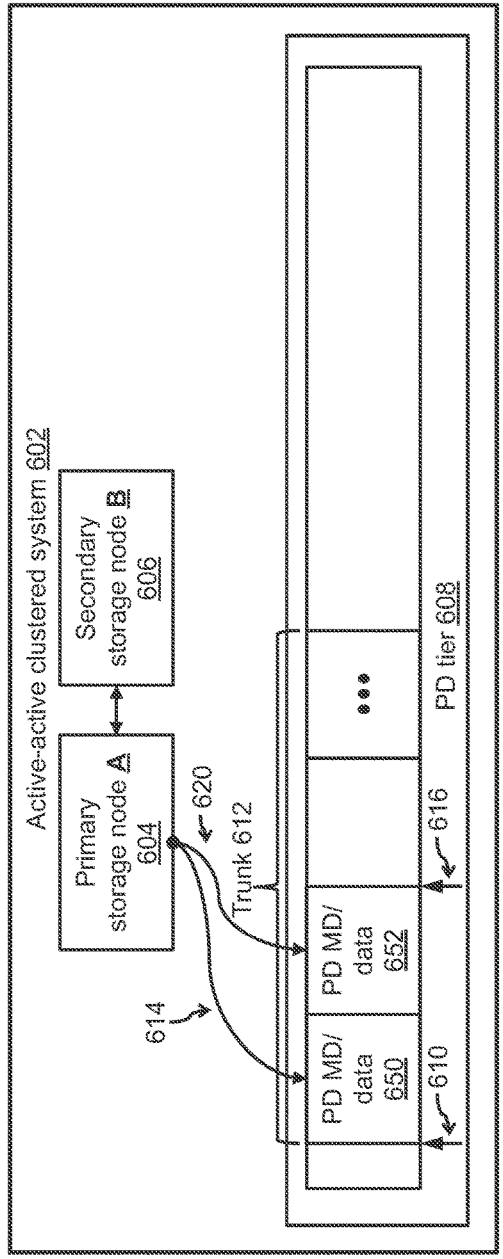

In this first example, the primary storage node A 604 performs a write IO operation to write PD MD/data having a size of 512 bytes (or any other suitable size) to the PD tier 608. As shown in FIG. 6b, the primary storage node A 604 allocates a first trunk 612 in the PD tier 608, in which the first trunk 612 has an associated head pointer 616 and an associated tail pointer 610, as well as a size of 128 KB (or any other suitable size). Having allocated the first trunk 612 in the PD tier 608, the primary storage node A 604 performs the write IO operation (illustrated by a path 614) by writing PD MD/data 650 to the head of the first trunk 612. The primary storage node A 604 then performs another write IO operation to write PD MD/data having a size of 512 bytes (or any other suitable size) to the PD tier 608. As shown in FIG. 6c, the primary storage node A 604 performs the write IO operation (illustrated by a path 620) by sequentially writing PD MD/data 652 to the head of the first trunk 612.

Figure 6D:
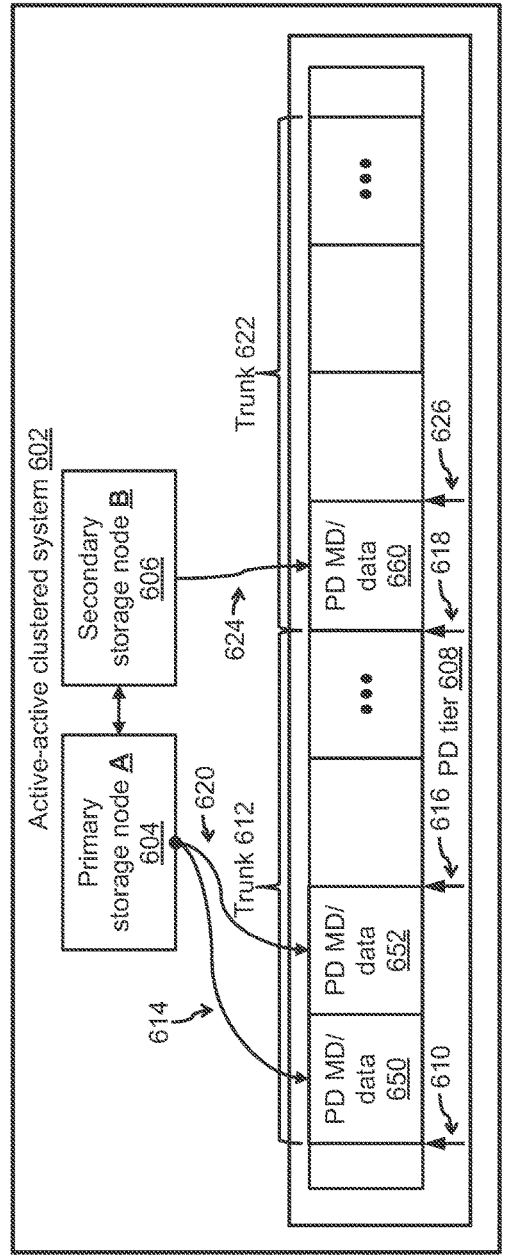

Further in this first example, before performing a commit of an IO transaction, the secondary storage node B 606 obtains authorization from the primary storage node A 604 to write PD MD/data to the PD tier 608. Once such authorization to write PD MD/data has been obtained from the primary storage node A 604, the secondary storage node B 606 performs a write IO operation to write PD MD/data having a size of 512 bytes (or any other suitable size) to the PD tier 608. As shown in FIG. 6d, the primary storage node A 604 allocates a second trunk 622 in the PD tier 608, in which the second trunk 622 has an associated head pointer 626 and an associated tail pointer 618, as well as a size of 128 KB (or any other suitable size). Once the second trunk 622 has been allocated in the PD tier 608, the secondary storage node B 606 performs the write IO operation (illustrated by a path 624) by writing PD MD/data 660 to the head of the second trunk 622.

Figure 6E:
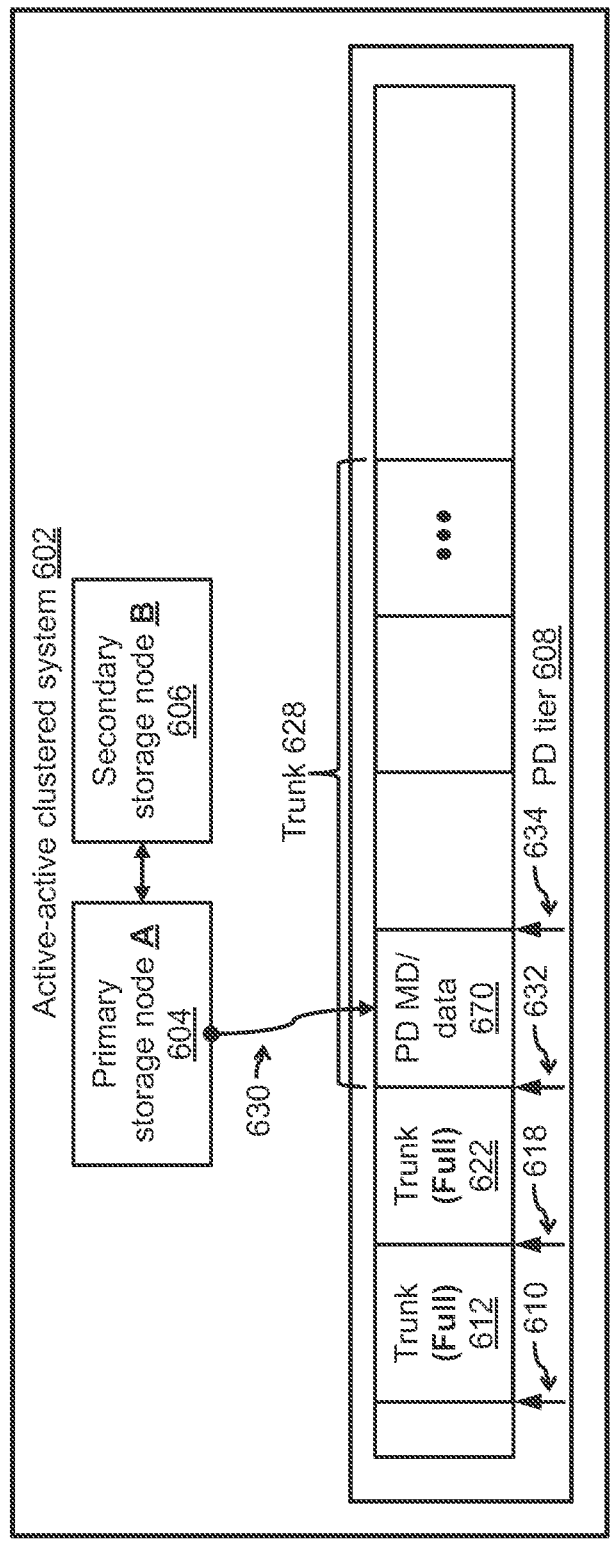

Subsequent write IO operations of the primary storage node A 604 and the secondary storage node B 606 are performed by sequentially writing specified PD metadata and/or data to the first trunk 612 and the second trunk 622, respectively, of the PD tier 608. As shown in FIG. 6e, such subsequent write IO operations of the primary and secondary storage nodes A 604, B 606 are performed until the first trunk 612 and the second trunk 622 have reached their storage capacities (e.g., 128 KB), as indicated by the label "Full" on each of the first and second trunks 612, 622. It is noted that the PD MD/data units written to the first trunk 612 by the primary storage node A 604, as well as the PD MD/data units written to the second trunk 622 by the secondary storage node B 606, are LBA continuous (i.e., the corresponding IO is sequential). In this first example, the primary storage node A 604 performs still another write IO operation to write PD MD/data having a size of 512 bytes (or any other suitable size) to the PD tier 608. As shown in FIG. 6e, because the first trunk 612 is "Full," the primary storage node A 604 allocates a third trunk 628 in the PD tier 608, in which the third trunk 628 has an associated head pointer 634 and an associated tail pointer 632, as well as a size of 128 KB (or any other suitable size). Having allocated the third trunk 628 in the PD tier 608, the primary storage node A 604 performs the write IO operation (illustrated by a path 630) by writing PD MD/data 670 to the head of the third trunk 628. Because the second trunk 622 is also "Full", the primary storage node A 604 can allocate a fourth trunk (not shown) in the PD tier 608 in response to still another write IO operation of the secondary storage node B 606. It is noted that, like the PD MD/data units sequentially written to the first trunk 612 and the second trunk 622, PD MD/data units written to the third trunk 628 and the fourth trunk (not shown) by the primary storage node A 604 and the secondary storage node B 606, respectively, are LBA continuous (i.e., the corresponding IO is sequential).

In a second example, a conventional active-active clustered system 702 (see FIG. 7) includes a primary storage node A 704, a secondary storage node B 706, a PD tier 708, a plurality of IO queues 734, 736, and an NVM device 738. The PD tier 708 is configured as a ring buffer having an associated head pointer 742 and an associated tail pointer 740. In this second example, the primary storage node A 704 performs a write IO operation (illustrated by a path 718) to write PD MD/data 710 having a size of 512 bytes (or any other suitable size) to the head of the PD tier 708 configured as a ring buffer. Further, before performing a commit of an IO transaction to write PD MD/data to the PD tier 708, the secondary storage node B 706 obtains authorization from the primary storage node A 704. Once such authorization to write the PD MD/data has been obtained from the primary storage node A 704, the secondary storage node B 706 performs a write IO operation (illustrated by a path 722) to write PD MD/data 712 having a size of 512 bytes (or any other suitable size) to the head of the PD tier 708. In addition, the primary storage node A 704 performs another write IO operation (illustrated by a path 720) to write PD MD/data 714 having a size of 512 bytes (or any other suitable size) to the head of the PD tier 708. Likewise, once further authorization to perform a commit of an IO transaction to write PD MD/data to the PD tier 708 is obtained from the primary storage node A 704, the secondary storage node B 706 performs another write IO operation (illustrated by a path 724) to write PD MD/data 716 having a size of 512 bytes (or any other suitable size) to the head of the PD tier 708. As shown in FIG. 7, the PD MD/data 710, 712, 714, 716 are written by the respective storage nodes A 704, B 706 between the head pointer 742 and the tail pointer 740 of the PD tier 708.

In this second example, before storing the PD MD/data from the PD tier 708 to the NVM device 738, at least the PD MD/data 710, 714 written by the primary storage node A 704 are pushed over paths 726, 730, respectively, to the IO queue 734. Likewise, at least the PD MD/data 712, 716 written by the secondary storage node B 706 are pushed over paths 728, 732, respectively, to the IO queue 736. For example, the plurality of IO queues 734, 736 can correspond to respective IO queues in a RAID system, which can be configured to control IO merging of small (e.g., 512 byte) IO for subsequent storage to the NVM device 738. However, because the primary storage node A 704 and the secondary storage node B 706 have successively alternated between writing PD MD/data to the PD tier 708, the PD MD/data 710, 714 written by the primary storage node A 704 are LBA discontinuous (i.e., the corresponding IO is nonsequential). Likewise, the PD MD/data 712, 716 written by the secondary storage node B 706 are LBA discontinuous (i.e., the corresponding IO is nonsequential). Because such small (e.g., 512 byte) nonsequential IO can be difficult to efficiently merge, the 512-byte PD MD/data are stored to the NVM device 738 without first merging the PD MD/data in the respective IO queues 734, 736.

Figure 8:
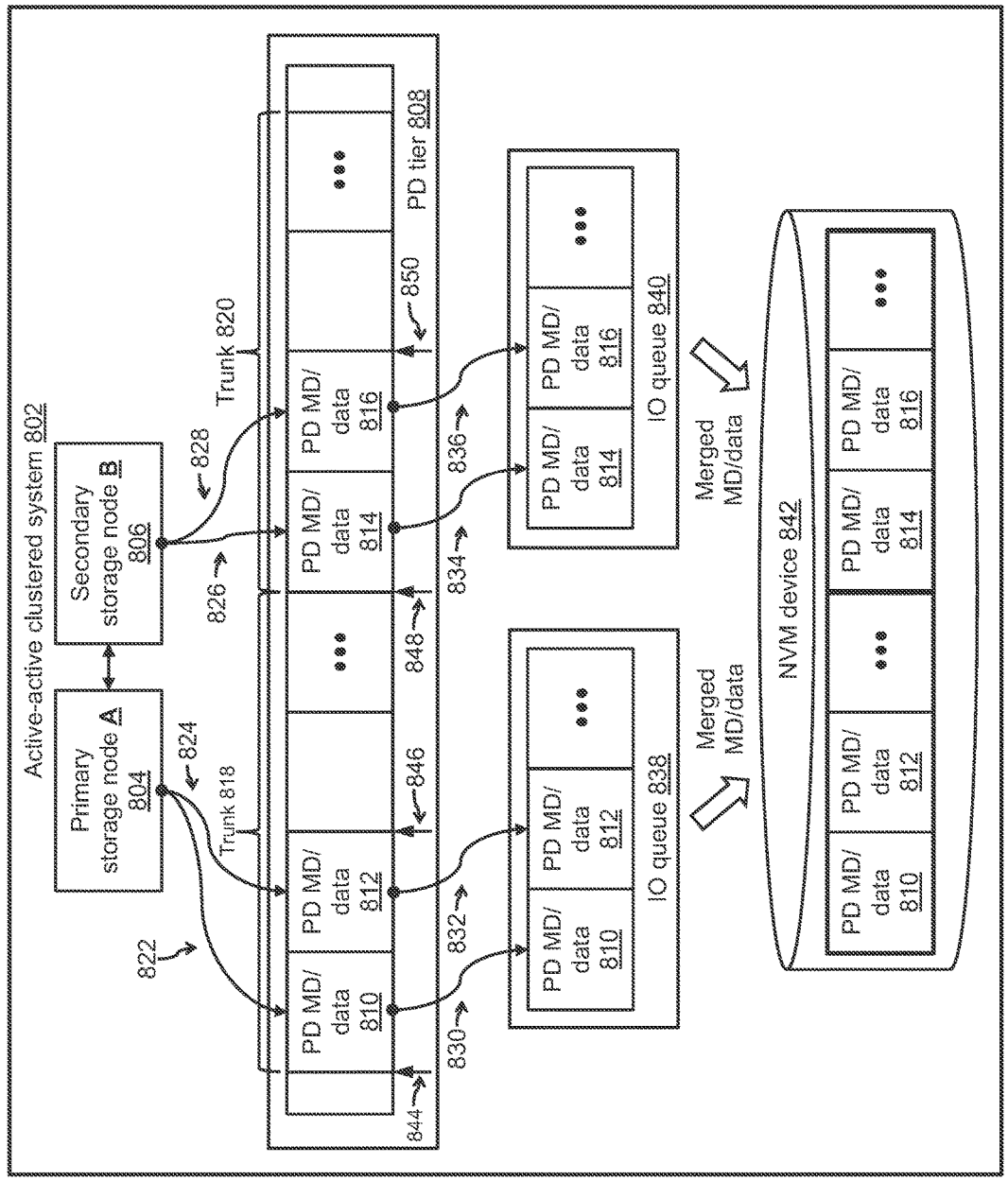
FIG. 8 is a block diagram of a technique for writing PD metadata/data from a PD tier of an active-active clustered system to an NVM device.

In a third example, an active-active clustered system 802 (see FIG. 8) includes a primary storage node A 804, a secondary storage node B 806, a PD tier 808, a plurality of IO queues 838, 840, and an NVM device 842. The PD tier 808 is configured as a ring buffer with an allocated first trunk 818 and an allocated second trunk 820. The first trunk 818 has an associated head pointer 846 and an associated tail pointer 844, and the second trunk 820 has an associated head pointer 850 and an associated tail pointer 848. In this third example, the primary storage node A 804 performs a write IO operation (illustrated by a path 822) to write PD MD/data 810 having a size of 512 bytes (or any other suitable size) to the head of the first trunk 818. Further, before performing a commit of an IO transaction to write PD MD/data to the PD tier 808, the secondary storage node B 806 obtains authorization from the primary storage node A 804. Once such authorization to write the PD MD/data has been obtained from the primary storage node A 804, the secondary storage node B 806 performs a write IO operation (illustrated by a path 826) to write PD MD/data 814 having a size of 512 bytes (or any other suitable size) to the head of the second trunk 820. In addition, the primary storage node A 804 performs another write IO operation (illustrated by a path 824) to sequentially write PD MD/data 812 having a size of 512 bytes (or any other suitable size) to the head of the first trunk 818. Likewise, once further authorization to perform a commit of an IO transaction to write PD MD/data to the PD tier 808 is obtained from the primary storage node A 804, the secondary storage node B 806 performs another write IO operation (illustrated by a path 828) to sequentially write PD MD/data 816 having a size of 512 bytes (or any other suitable size) to the head of the second trunk 820. As shown in FIG. 8, the PD MD/data 810, 812 are sequentially written by the primary storage node A 804 between the head pointer 846 and the tail pointer 844 of the first trunk 818. Similarly, the PD MD/data 814, 816 are sequentially written by the secondary storage node B 806 between the head pointer 850 and the tail pointer 848 of the second trunk 820.

In this third example, before storing the PD MD/data from the PD tier 808 to the NVM device 842, the PD MD/data 810, 812 sequentially written by the primary storage node A 804 are pushed over paths 830, 832, respectively, to the IO queue 838. Likewise, the PD MD/data 814, 816 sequentially written by the secondary storage node B 806 are pushed over paths 834, 836, respectively, to the IO queue 840. As in the second example, the plurality of IO queues 838, 840 can correspond to respective IO queues in a RAID system, which can be configured to perform 10 merging to merge small (e.g., 512 byte) IO for subsequent storage to the NVM device 842. Because the PD MD/data 810, 812 in the IO queue 838 are LBA continuous (i.e., the corresponding IO is sequential), they can be efficiently merged to obtain PD MD/data having an increased size, up to the size of the first trunk 818. Likewise, because the PD MD/data 814, 816 in the IO queue 840 are LBA continuous (i.e., the corresponding IO is sequential), they can be efficiently merged to obtain PD MD/data having an increased size, up to the size of the second trunk 820. The merged PD MD/data 810, 812, . . . can then be stored from the IO queue 838 to the NVM device 842. Likewise, the merged PD MD/data 814, 816, . . . can then be stored from the IO queue 840 to the NVM device 842.

A method of generating merge-friendly sequential IO patterns in a shared PD tier is described below with reference to FIG. 9. As depicted in block 902, at least a first trunk and a second trunk are allocated in a shared PD tier of a logger. As depicted in block 904, PD metadata and/or data are sequentially written by a primary storage node and a secondary storage node to the first trunk and the second trunk, respectively. As depicted in block 906, the PD metadata/data sequentially written to the respective trunks are merged to obtain PD metadata/data having an increased size up to the size of the respective trunks. As depicted in block 908, the merged PD metadata/data are stored to an NVM device.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of generating merge-friendly sequential input/output (IO) patterns in a shared page descriptor (PD) tier, comprising:
    allocating at least a first trunk and a second trunk in a shared PD tier of a logger, wherein the first trunk and the second trunk are different trunks;
    sequentially writing first PD metadata and/or data by a primary storage node IQ the first trunk, and sequentially writing second PD metadata and/or data by a secondary storage node to the second trunk;
    merging the first PD metadata and/or data sequentially written to the first trunk to obtain first merged PD metadata and/or data, and merging the second PD metadata and/or data sequentially written to the second trunk to obtain second merged PD metadata and/or data; and
    storing the first merged PD metadata and/or data and the second merged PD metadata and/or data to a non-volatile memory (NVM) device.

2. The method of claim 1, wherein the first trunk has an associated head pointer and an associated tail pointer, and wherein sequentially writing the first PD metadata and/or data to the first trunk includes writing the first PD metadata and/or data to a head of the first trunk.

3. The method of claim 2, wherein the second trunk has an associated head pointer and an associated tail pointer, and wherein sequentially writing the second PD metadata and/or data to the second trunk includes writing the second PD metadata and/or data to a head of the second trunk.

4. The method of claim 1, further comprising:
    in response to the first trunk having reached its storage capacity, allocating a third trunk in the shared PD tier of the logger; and
    sequentially writing, by the primary storage node, third PD metadata and/or data to the third trunk.

5. The method of claim 4, further comprising:
    in response to the second trunk having reached its storage capacity, allocating a fourth trunk in the shared PD tier of the logger; and
    sequentially writing, by the secondary storage node, fourth PD metadata and/or data to the fourth trunk.

6. The method of claim 1, further comprising:
    pushing the first PD metadata and/or data sequentially written to the first trunk to a first IO queue,
    wherein merging the first PD metadata and/or data includes merging the first PD metadata and/or data in the first IO queue to obtain the first merged PD metadata and/or data.

7. The method of claim 6, further comprising:
    pushing the second PD metadata and/or data sequentially written to the second trunk to a second IO queue,
    wherein merging the second PD metadata and/or data further includes merging the second PD metadata and/or data in the second IO queue to obtain the second merged PD metadata and/or data.

8. The method of claim 7, wherein storing the first merged PD metadata and/or data and the second merged PD metadata and/or data includes storing the first merged PD metadata and/or data from the first IO queue to the NVM device, and storing the second merged PD metadata and/or data from the second IO queue to the NVM device.

9. The method of claim 1, further comprising:
    obtaining, by the secondary storage node, authorization from the primary storage node to write the second PD metadata and/or data to the shared PD tier of the logger.

10. The method of claim 9, wherein allocating the second trunk in the shared PD tier of the logger includes allocating the second trunk in the shared PD tier in response to the authorization from the primary storage node being obtained.

11. An active-active clustered system, comprising:
    a primary storage node;
    a secondary storage node different from the primary storage node;
    a first IO queue;
    a second IO queue;
    a logger including a shared page descriptor (PD) tier; and
    a non-volatile memory (NVM) device,
    wherein the primary storage node is configured to allocate at least a first trunk and a second trunk in the shared PD tier of the logger, and to sequentially write first PD metadata and/or data to the first trunk, wherein the first trunk and the second trunk are different trunks,
    wherein the secondary storage node is configured to sequentially write second PD metadata and/or data to the second trunk,
    wherein the logger is configured to be controlled for pushing the first PD metadata and/or data from the first trunk to the first IO queue, and for pushing the second PD metadata and/or data from the second trunk to the second IO queue,
    wherein the first IO queue is configured to be controlled for merging the first PD metadata and/or data pushed from the first trunk to obtain first merged PD metadata and/or data, and for storing the first merged PD metadata and/or data to the NVM device, and
    wherein the second IO queue is configured to be controlled for merging the second PD metadata and/or data pushed from the second trunk to obtain second merged PD metadata and/or data, and for storing the second merged PD metadata and/or data to the NVM device.

12. The system of claim 11, wherein the first trunk has an associated head pointer and an associated tail pointer, and wherein the primary storage node is further configured to write the first PD metadata and/or data to a head of the first trunk.

13. The system of claim 12, wherein the second trunk has an associated head pointer and an associated tail pointer, and wherein the secondary storage node is further configured to write the second PD metadata and/or data to a head of the second trunk.

14. The system of claim 11, wherein the primary storage node is further configured, in response to the first trunk having reached its storage capacity, to allocate a third trunk in the shared PD tier of the logger, and to sequentially write third PD metadata and/or data to the third trunk.

15. The system of claim 14, wherein the primary storage node is further configured, in response to the second trunk having reached its storage capacity, to allocate a fourth trunk in the shared PD tier of the logger.

16. The system of claim 15, wherein the secondary storage node is further configured to sequentially write fourth PD metadata and/or data to the fourth trunk.

17. A computer program product including a set of non-transitory, computer-readable media having instructions that, when executed by storage processing circuitry, cause the storage processing circuitry to perform a method comprising:

allocating at least a first trunk and a second trunk in a shared page descriptor (PD) tier of a logger, wherein the first trunk and the second trunk are different trunks;

sequentially writing first PD metadata and/or data by a primary storage node to the first trunk, and sequentially writing second PD metadata and/or data by a secondary storage node to the second trunk;

merging the first PD metadata and/or data sequentially written to the first trunk to obtain first merged PD metadata and/or data, and merging the second PD metadata and/or data sequentially written to the second trunk to obtain second merged PD metadata and/or data; and storing the first merged PD metadata and/or data and the second merged PD metadata and/or data to a non-volatile memory (NVM) device.

18. The computer program product of claim 17, wherein the method further comprises:

pushing the first PD metadata and/or data sequentially written to the first trunk to a first IO queue, wherein merging the first PD metadata and/or data includes merging the first PD metadata and/or data in the first IO queue to obtain the first merged PD metadata and/or data.

19. The computer program product of claim 18, wherein the method further comprises:

pushing the second PD metadata and/or data sequentially written to the second trunk to a second IO queue, wherein merging the second PD metadata and/or data further includes merging the second PD metadata and/or data in the second IO queue to obtain the second merged PD metadata and/or data.

20. The computer program product of claim 19, wherein storing the first merged PD metadata and/or data and the second merged PD metadata and/or data includes storing the first merged PD metadata and/or data from the first IO queue to the NVM device, and storing the second merged PD metadata and/or data from the second IO queue to the NVM device.

* * * * *